United States Patent [19]

Hönig et al.

[11] 4,395,502
[45] Jul. 26, 1983

[54] CATHODICALLY DEPOSITABLE COATING COMPOSITIONS FOR ELECTRODEPOSITION (II)

[75] Inventors: Helmut Hönig; Georgios Pampouchidis, both of Graz, Austria

[73] Assignee: Vianova Kunstharz, A. G., Vienna, Austria

[21] Appl. No.: 854,628

[22] Filed: Dec. 1, 1977

[51] Int. Cl.$^3$ .............................................. C08L 63/02
[52] U.S. Cl. ................................ 523/415; 204/181 C; 523/414; 524/901; 525/528
[58] Field of Search ....................... 523/415, 414, 417; 524/901; 204/181 C; 525/528

[56] References Cited

U.S. PATENT DOCUMENTS

| | | | |
|---|---|---|---|
| 3,883,483 | 5/1975 | Anderson et al. | 524/901 |
| 4,147,676 | 4/1979 | Pampouchidis | 524/901 |
| 4,238,594 | 12/1980 | Pampouchidis | 524/901 |
| 4,320,220 | 3/1982 | Pampouchidis | 524/901 |

*Primary Examiner*—Theodore E. Pertilla
*Attorney, Agent, or Firm*—A. W. Breiner

[57] ABSTRACT

Heat curable, cathodically depositable, aqueous coating compositions comprising an aqueous emulsion of 98 to 50 percent by weight, preferably 95 to 70 percent by weight, of one or more self-crosslinking cationic binders based on modified epoxy compounds, water-soluble upon partial or total neutralization with an inorganic or organic acid, and 2 to 50 percent by weight, preferably 5 to 30 percent by weight, of a di- and/or triurethane having the formula -

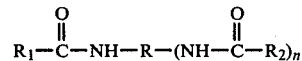

wherein R represents an aromatic, cycloaliphatic, or aliphatic hydrocarbon radical; $R_1$ stands for a hydroxyethyl(meth)acrylate or a hydroxypropyl(meth)acrylate radical; $R_2$ is the radical of a saturated and/or unsaturated aliphatic monoalcohol with at least 6 carbon atoms and/or an alkyl or alkylene radical with at least 6 carbon atoms, and n is an integer of 1 or 2. The coating compositions cure at low temperatures and short curing times to provide films having excellent resistance to water, chemicals, and corrosion; and have good leveling characteristics and good adherence to diverse substrates.

7 Claims, No Drawings

CATHODICALLY DEPOSITABLE COATING COMPOSITIONS FOR ELECTRODEPOSITION (II)

FIELD OF INVENTION AND BACKGROUND

The present invention is directed to the preparation of, and coating compositions which are water-dilutable upon neutralization with acids. The coating compositions are electrically depositable at the cathode of an electrodeposition system and will crosslink through thermal polymerization.

Electrodeposition of synthetic resins and plastics, although known for quite some time, has gained technical importance as a coating process in only recent years. The coating compositions or binders primarily used commercially for electrodeposition contain polycarboxylic acid resins neutralized with bases. The products deposit at the anode of an electrodeposition system. Owing to the acidic character of the resins, they are sensitive to corroding influences exerted by salts and particularly by alkalis. Furthermore, coatings of the aforesaid compositions tend to undergo spot discoloration or undergo other chemical changes as a result of the metal ions anodically dissolved from the anode. Accordingly, there is a desire to use coating compositions which will deposit at the cathode of an electrodeposition system.

There are a substantial number of binders disclosed in the literature carrying grouping neutralizable with acids which can be deposited on cathodically wired objects of an electrodeposition system. Many have disadvantages primarily due to the need to have crosslinking additives in the coating compositions which adversely affect film characteristics. Recently, however, coating compsitions have been provided which are self-crosslinking through thermal polymerization. These self-crosslinking binders include binders comprising- (A) the reaction products of diepoxy compounds with alpha, beta-unsaturated acids and, optionally, long chain fatty acids, and basic monosiocyanates as described in copending application Ser. No. 816,936 filed July 19, 1977, now U.S. Pat. No. 4,238,594, assigned to the assignee of the present application;

(B) reaction products of diepoxy compounds with monoamines and, optionally, fatty acids, and unsaturated monoisocyanates as described in copending application Ser. No. 816,937 filed July 20, 1977, now U.S. Pat. No. 4,320,220, assigned to the assignee of the present application; and (C) two moles of a diepoxy compound plus one mole of a primary-tertiary or secondary-secondary diamine plus two moles of an alpha, beta-unsaturated monocarboxylic acid and, optionally, an unsaturated fatty acid, plus an unsaturated monoisocyanate as described in copending application Ser. No. 849,265 filed Nov. 7, 1977, now U.S. Pat. No. 4,147,676, assigned to the assignee of the present application.

The aforesaid binders are highly desirable due to their ability to self-cross-link through the presence of alpha, beta-unsaturation; their being water-soluble in the presence of acids due to the basic nitrogen atoms, and their ability to provide excellent films with good performance characteristics, particularly regarding resistance to corroding influences. At times, however, these binders provide films having certain deficiencies as a result of poor leveling of the coating composition on certain substrates and a generally reduced adhesion on certain substrates, particularly untreated steel.

OBJECTS OF THE INVENTION AND GENERAL DESCRIPTION

It has now been found that the above-noted disadvantages with respect to leveling and lack of adhesion can be eliminated by emulsifying the water-soluble cationic binders with select di- and/or triurethanes. It has been found that not only is the leveling and adhesion characteristics of the binders improved by emulsification with the select di- or triurethanes, but surprisingly the emulsions obtained, without use of additional emulsifiers, have excellent stability even when water diluted for use in coating compositions to be applied at the cathode of an electrodeposition process. The added select di- or triurethanes, however, exert a favorable influence on the viscosity of the coating compositions and on the curing characteristics of films deposited from the coating compositions, namely, enhanced corrosion resistance, in addition to the improved leveling characteristic and adhesion of the film to diverse substrates. Furthermore, the addition of the non-water-soluble, fatty acid modified polyester resins permits regulation of the deposition equivalent which in turn influences the formation of the film on deposition.

Accordingly, the cathodically depositable binders of the invention in addition to pigments, extenders, and, if desired, hardening components and/or other additives, contain as the binder an aqueous emulsion of 98 to 50 percent by weight, preferably 95 to 70 percent by weight, of one or more self-crosslinking resins based on modified epoxy compounds water-soluble upon partial or total neutralization in water with inorganic and/or inorganic acids; and 2 to 50 percent by weight, preferably 5 to 30 percent by weight, of a di- and/or triurethane having the formula

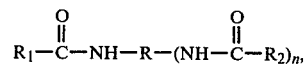

wherein R represents an aromatic, cycloaliphatic, or aliphatic hydrocarbon radical; $R_1$ stands for a hydroxyethyl(meth)acrylate or a hydroxypropyl(meth)acrylate radical; $R_2$ is the radical of a saturated and/or unsaturated aliphatic monoalcohol with at least 6 carbon atoms and/or an alkyl or alkylene radical with at least 6 carbon atoms, and n is an integer of 1 or 2.

The cathodically depositable binders for coating compositions which can be emulsified with the non-water-soluble, di- or triurethanes are self-crosslinking binders based on modified epoxy compounds, and particularly binders comprising:

(A) the reaction products of diepoxy compounds with alpha, beta-unsaturated acids and, optionally, long chain fatty acids, and basic monoisocyanates as described in copending application Ser. No. 816,936 filed July 19, 1977, assigned to the assignee of the present application;

(B) reaction products of diepoxy compounds with mono-amines and, optionally, fatty acids, and unsaturated monoisocyanates as described in copending application Ser. No. 816,937 filed July 19, 1977, assigned to the assignee of the present application; and (C) two moles of a diepoxy compound plus one mole of a primary-tertiary or secondary-secondary diamine plus two moles of an alipha, beta-unsaturated monocarboxylic acid and, optionally, an unsaturated fatty acid, plus an unsaturated monoisocyanate as described in copending application Ser. No. 849,265 filed Nov. 7, 1977, assigned to the assignee of the present application.

The di- or triurethanes emulsified in or with the water-soluble cationic resins as hereinbefore described have the general formula

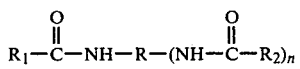

wherein R represents an aromatic (preferably phenyl or naphthyl), cycloaliphatic, or aliphatic (preferably of 2 to 10 carbon atoms) hydrocarbon radical; $R_1$ stands for a hydroxyethyl(meth)acrylate or a hydroxypropyl(meth)acrylate radical; $R_2$ is the radical of a saturated and/or unsaturated aliphatic monoalcohol with at least 6 carbon atoms and/or an alkyl or alkylene radical with at least 6 carbon atoms, and n is an integer of 1 or 2. The compounds are prepared by stepwise or simultaneous reaction of 1 mole of a corresponding di- or triisocyanate with 1 mole of hydroxyethyl acrylate or hydroxypropyl acrylate or of the corresponding methacrylates and 1 or 2 moles of the longer chain saturated or unsaturated monoalcohol or a corresponding monocarboxylic acid at 20° to 80° C., optionally in the presence of an isocyanate inert solvent. Suitable di- or triisocyanates are, e.g., aromatic isocyanates, such as 2,4- or 2,6-toluene diisocyanate; 4,4'-diphenylmethane diisocyanate; or cycloaliphatic isocyanates such as isophorone diisocyanate and cyclohexane-1,4-diisocyanate as well as aliphatic isocyanates such as trimethyl-hexamethylene-1,6-diisocyanate and trishexamethylene-triisocyanate. As used herein, the di- and triisocyanates are at times referred to as polyisocyanates. Any long chain monoalcohol with at least 6 carbon atoms in the chain is suitable. Saturated alcohols in this group include the n-alcanols, particularly saturated fatty alcohols. Suitable unsaturated alcohols include, on the one hand, those with an alpha, betaethylenic double bond, such as esters of acrylic and methacrylic acid with a di- or triol or a polyglycol, and, on the other hand, unsaturated fatty alcohols. Furthermore, saturated or unsaturated fatty acids with at least 6 carbon atoms are suitable, such as perlargonic acid, lauric acid, stearic acid, oleic acid, linolenic acid, as well as mixtures of these acids as are obtained from the natural oils. During the reaction of fatty acids with the isocyanate, as is known, $CO_2$ is set free.

The basic groups (amine groups) of the cationic components are partially or totally neutralized with organic and/or inorganic acids, e.g., formic acid, acetic acid, lactic acid, phosphoric acid, etc. The degree of neutralization depends upon the properties of the binder employed in each individual case. In general, sufficient acid is added to provide dispersion or dilution with water of the coating composition at a pH-value of from 4 to 9, preferably from 6 to 8.

The combination, admixing, or emulsifying of the components advantageously is carried out in order that the binders are homogenized thoroughly, optionally at elevated temperature, prior to the addition of water. Subsequently, the neutralizing agent is stirred in and the batch is diluted with water to application viscosity, usually after milling the resin blend together with pigments and extenders.

The concentration of the binder in water depends upon the parameters of the electrodeposition process and may range from 3 to 30 percent by weight, preferably from 5 to 15 percent by weight. Upon electrodeposition, the binder of the invention as a vehicle of the aqueous coating compsition is wired to a conductive anode and cathode, the surface of the cathode being coated with the coating composition. The conductive substrates to be coated may be any of a variety of materials, and particularly metals such as steel, aluminum, copper, or the like. Other metalized materials or materials rendered conductive through a conductive coating can be employed. After deposition, the coating is cured at a stoving temperature of from about 130° to 200° C., preferably 150° to 180° C., for from about 5 to 30 minutes, preferably 10 to 25 minutes.

The following examples illustrate the invention without limiting its scope.

WATER-DILUTABLE CATIONIC RESINS I–III

The composition of the water-dilutable cationic resins are tabulated in Table 1 wherein all quantities are parts by weight. The resins were prepared as follows:

A reaction vessel is equipped with stirrer, addition funnel, thermometer, and reflux condensor. The epoxy compound listed in Table 1, solubilized in an isocyanate inert solvent such as monoethylene glycol monoethylether acetate (ethylglycol acetate), is charged to the vessel; and, upon addition of hydroquinone as an inhibitor, if desired, the monocarboxylic acid is added at elevated temperature. The reaction is carried to an acid value of below 5 mg KOH/g at 100° to 110° C. Epoxy resins with low melting points can be reacted without addition of solvents. The reaction product is mixed with the basic monoisocyanate intermediate designated in the table and is reacted at 60° to 70° C. to an NCO-value of 0. Access of moisture is avoided during the reaction.

TABLE 1

| Epoxy Resin, Solvent, Inhibitor | | Monocarboxylic Acids | | Basic Monoisocyanates |
|---|---|---|---|---|
| I | 1000 EPH B | 224 | TFS | 832 B (iso) |
|   | 560 AEGLAC | 86.5 | ACS |  |
|   | 0.2 HY |  |  |  |
| II | 1000 EPH B | 144 | ACS | 705 B (iso) |
|   | 492 AEGLAC |  |  |  |
|   | 0.2 HY |  |  |  |
| III | 520 EPH C | 564 | HE | 750 A (iso) |
|   | 465 AEGLAC |  |  |  |
|   | 0.3 HY |  |  |  |

EPH B - a solid epoxy resin based on Bisphenol A having a melting range of 65 to 75° C., an epoxy-equivalent of 485–510, and a molecular weight of about 1000.
EPH C - a highly viscous epoxy resin based on Bisphenol A having an epoxy-equivalent of about 260.
A(iso) - reaction product of 1 mole toluene diisocyanate and 1 mole dimethyl ethanolamine, 70 percent, dissolved in ethylacetate.
B(iso) - reaction product of 1 mole toluene diisocyanate and 1 mole diethylethanolamine, 70 percent, dissolved in ethylacetate.
HY — hydroquinone (an inhibitor).
TFS — tall oil fatty acids (with about 2 percent rosin acids).
ACS — acrylic acid.
HE - semi-ester of tetrahydrophthalic acid and hydroxyethyl methacrylate.
AEGLAC — ethylene glycol monoethylether acetate.

NON-WATER-SOLUBLE URETHANE COMPOUNDS

Compound A 174 g (1 mole) toluene diisocyanate is charged to a reaction vessel and reacted at 25° to 40° C. with 130 g hydroxyethylmethacrylate and 350 g tetrapropylene glycol monomethacrylate, the latter being added dropwise and simultaneously. The batch is finally heated to 70° C. and reacted to an NCO-value of 0.

Compound B

Analogous to Compound A, 174 g of toluene diisocyanate are reacted with 130 g of hydroxypropylacrylate and 266 g of linoleyl alcohol.

Compound C

Analogous to Compound A, 504 g of tris-hexamethylene triisocyanate are reacted with 130 g of hydroxypropylacrylate and 532 g of oleyl alcohol.

Compound D

To 174 g (1 mole) of toluene diisocyanate, 280 g linseed oil fatty acids are added at 80° C., and, after cooling the batch to 40° C., 130 g of hydroxyethylmethacrylate are added dropwise. The batch is reheated to 70° C. and reacted to an NCO-value of 0.

EXAMPLES 1-4

In accordance with Table 2, homogeneous blends of the abovedescribed water-soluble cationic resins and non-water-soluble urethanes were prepared. Each 100 parts (resin solids) of the resin blends were thereafter milled on a triple roll mill together with 22 parts aluminum silicate pigment, 2 parts carbon black, and 1 part lead chromate. The paint pastes were mixed with the listed neutralizing agents and diluted with deionized water to a solids content of 12.5 percent by weight. Electrodeposition of the blends was carried out in a plastic tank with a bath temperature of 30° C. and a deposition time of 60° C. The anode was a carbon plate. The cathodically wired substrate was untreated steel panels or iron phosphated steel plates as designated in Table 3. The deposited films were cured at 180° C. for 30 minutes in an air circulation oven.

TABLE 2

| Example | Cationic Resin | | | Urethane Compound | | | | Neutralizing Agent | |
|---|---|---|---|---|---|---|---|---|---|
| | I | II | III | A | B | C | D | ES | MS |
| 1 | 70 | — | — | 30 | — | — | — | 0.08 | — |
| 2 | — | 95 | — | — | 5 | — | — | — | 0.08 |
| 3 | — | — | 82 | — | — | 18 | — | 0.08 | — |
| 4 | — | 78 | — | — | — | — | 22 | 0.08 | — |

The resin quantities referred to are based on 100% resin solids. The quantity of neutralizing agent is in moles for 100 g resin solids.
ES - acetic acid.
MS - lactic acid.

Deposition conditions and test results are as listed in Table 3 as follows:

being obtainable. Additionally, the cationic water-soluble resin can be replaced with other cationic water-soluble resins which are of the self-crosslinking type and which are based on a modified diepoxide system. These and other modifications being within the ability of one skilled in the art are within the scope of the present invention.

It is claimed:

1. A coating composition which is cathodically deposited when used in an electrodeposition process comprising as the coating binder, an aqueous emulsion of 98 to 50 percent by weight of at least one self-crosslinking cationic binder based on a modified epoxy compound, water-dilutable upon partial or total neutralization with inorganic and/or organic acids, and 2 to 50 percent by weight of a urethane of the general formula

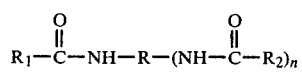

wherein R represents an aromatic, cycloaliphatic, or aliphatic hydrocarbon radical; $R_1$ stands for a hydroxyethyl(meth)acrylate or a hydroxypropyl(meth)acrylate radical; $R_2$ is the radical of a member of the group consisting of an aliphatic monoalcohol with at least 6 carbon atoms, an alkyl radical with at least 6 carbon atoms, and an alkylene radical with at least 6 carbon atoms; and n is an integer of 1 or 2.

2. The coating composition of claim 1 wherein the aqueous emulsion is from 95 to 70 percent by weight of the water-dilutable resin and from 5 to 30 percent by weight of the non-water-soluble urethane.

3. The coating composition of claim 2 including at least one member of the group consisting of pigments, extenders, and hardening components.

4. The coating composition of claim 2 wherein the water-dilutable resin is the reaction product of a diepoxide with alpha, beta-unsaturated acids and a basic monoisocyanate.

5. The coating composition of claim 2 wherein the water-dilutable resin is the reaction product of a diepoxide with a mono-amine and an unsaturated monoisocyanate.

6. The coating composition of claim 2 wherein the water-dilutable resin is the reaction product of 2 moles of a diepoxy compound, 1 mole of a primary-tertiary or secondary-secondary diamine, 2 moles of an alpha, beta-unsaturated monocarboxylic acid, and an unsaturated monoisocyanate.

7. The process of providing coating compositions

TABLE 3

| Example From Table 2 | Deposition Voltage | Film Thickness μm | Surface Quality | Indentation, DIN 53156 mm | Untreated Steel | | Iron-Phosphated Steel | |
|---|---|---|---|---|---|---|---|---|
| | | | | | Hardness, Persoz, sec. | Salt Spray ASTM B-117-64 After 200 h | Hardness, Persoz, sec. | Salt Spray ASTM B-117-64 After 240 h |
| 1 | 120 | 20 | 1 | 7.1 | 250 | 1-2 | 250 | 1 |
| 2 | 200 | 20 | 1-2 | 4.3 | 275 | 1 | 280 | 1 |
| 3 | 140 | 22 | 1-2 | 6.6 | 255 | 2 | 250 | 1 |
| 4 | 180 | 21 | 1-2 | 5.4 | 250 | 1-2 | 255 | 1 | surface evaluation - 1 = excellent 2 = slightly wavy
salt spray evaluation - 1 = no visible attack 2 = slight corrosion underneath
Adhesion in all cases is from Gt O B to 1 B according to DIN 53 151, which is excellent.

In the above illustrative examples the cationic water-soluble resin and non-water-soluble urethane component can be modified and/or the amounts varied within the bounds herein designated with enhanced results which will cathodically deposit when used in an electrodeposition process including emulsifying 98 to 50 percent by weight of at least one self-crosslinking cationic binder based on a modified epoxy compound, water-dilutable upon partial or total neutralization with inorganic and/or organic acids, and 2 to 50 percent by weight of a urethane of the general formula

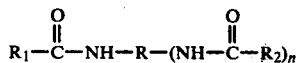

wherein R represents an aromatic, cycloaliphatic, or aliphatic hydrocarbon radical; $R_1$ stands for a hydroxyethyl(meth)acrylate or a hydroxypropyl(meth)acrylate radical; $R_2$ is the radical of a member of the group consisting of an aliphatic monoalcohol with at least 6 carbon atoms, an alkyl radical with at least 6 carbon atoms, and an alkylene radical with at least 6 carbon atoms; and n is an integer of 1 or 2.

* * * * *